US009763851B2

(12) United States Patent
Lenke (10) Patent No.: US 9,763,851 B2
(45) Date of Patent: Sep. 19, 2017

(54) STIMULATION DEVICE

(71) Applicant: NOVOLUTO GmbH, Metten (DE)

(72) Inventor: Michael Lenke, Metten (DE)

(73) Assignee: Novoluto GmbH, Metten (DE)

( * ) Notice: Subject to any disclaimer, the term of this patent is extended or adjusted under 35 U.S.C. 154(b) by 0 days.

(21) Appl. No.: 15/023,471

(22) PCT Filed: Jul. 22, 2014

(86) PCT No.: PCT/EP2014/065734
§ 371 (c)(1),
(2) Date: Mar. 21, 2016

(87) PCT Pub. No.: WO2015/039787
PCT Pub. Date: Mar. 26, 2015

(65) Prior Publication Data
US 2016/0213557 A1     Jul. 28, 2016

(30) Foreign Application Priority Data

Sep. 23, 2013   (DE) .................. 10 2013 110 501

(51) Int. Cl.
*A61H 19/00*    (2006.01)
*A61H 9/00*     (2006.01)

(52) U.S. Cl.
CPC ............... *A61H 19/34* (2013.01); *A61H 9/00* (2013.01); *A61H 9/005* (2013.01); *A61H 9/0007* (2013.01);
(Continued)

(58) Field of Classification Search
CPC ........ A61H 19/00; A61H 19/30; A61H 19/34; A61H 19/32; A61H 19/50; A61H 7/00;
(Continued)

(56) References Cited

U.S. PATENT DOCUMENTS 787,443 A * 4/1905 Godman et al. ........ A61F 11/00
601/77
1,042,058 A * 10/1912 Hook ...................... A61F 11/00
340/388.3
(Continued)

FOREIGN PATENT DOCUMENTS

CN    2153351 Y    1/1994
CN    2198900 Y    5/1995
(Continued)

OTHER PUBLICATIONS

"Can." Thefreedictionary.com. The free dictionary by Farlex, 2016. Web. Dec. 26, 2016.*
(Continued)

*Primary Examiner* — Justine Yu
*Assistant Examiner* — Tu Vo
(74) *Attorney, Agent, or Firm* — Chiesa Shahinian & Giantomasi PC (57) ABSTRACT

The invention relates to a stimulation device (1) for erogenous zones, in particular for the clitoris (12), which device (1) has at least one pressure field generator (2) with at least a first chamber (3) and at least a second chamber (4) with at least one opening (42) for placing onto a body part (11), and at least one connection element (5) which connects the first chamber (3) to the second chamber (4), and with a drive unit (6) which changes the volume of the first chamber (3) in such a way that, by way of the connection element (5), a pressure field is generated in the second chamber (4) and serves for stimulation; and a control device (7) which controls the drive unit (6).

8 Claims, 7 Drawing Sheets

(52) U.S. Cl.
CPC ........... *A61H 9/0057* (2013.01); *A61H 19/00* (2013.01); *A61H 19/30* (2013.01); *A61H 2201/0153* (2013.01); *A61H 2201/0157* (2013.01); *A61H 2201/1207* (2013.01); *A61H 2201/1238* (2013.01); *A61H 2201/1409* (2013.01)

(58) Field of Classification Search
CPC ........ A61H 7/008; A61H 7/003; A61H 7/004; A61H 9/00; A61H 9/0007; A61H 9/005; A61H 9/0057; A61H 2009/0064; A61H 9/0071; A61H 2201/0153; A61H 2201/0157; A61H 2201/12; A61H 2201/1207; A61H 2201/1238; A61H 2201/1409; A61H 2201/1418; A61H 2205/087; A61H 2201/5097
USPC ............................................. 601/6, 9; 600/38
See application file for complete search history.

(56) References Cited

U.S. PATENT DOCUMENTS

| | | | |
|---|---|---|---|
| 1,882,040 A | 10/1932 | Roehm | |
| 1,898,652 A | 2/1933 | Williams | |
| 1,964,590 A | 6/1934 | Friederich | |
| 2,017,284 A | 10/1935 | Lembright | |
| 2,076,410 A | 4/1937 | McGerry | |
| 2,112,646 A | 3/1938 | Biederman | |
| 2,154,427 A | 4/1939 | Andres | |
| 2,218,081 A * | 10/1940 | Brichieri-Colombi | A61H 23/04 601/139 |
| 2,234,102 A | 3/1941 | Andres | |
| 2,314,590 A | 3/1943 | McCarty | |
| 2,519,790 A | 8/1950 | Quinn | |
| 2,561,034 A | 7/1951 | Phillips | |
| 3,396,720 A | 8/1968 | Shigeyuki | |
| 3,906,940 A | 9/1975 | Kawada | |
| 3,910,262 A | 10/1975 | Stoughton | |
| 4,088,128 A * | 5/1978 | Mabuchi | A61H 23/0254 601/101 |
| 4,203,431 A | 5/1980 | Abura et al. | |
| 4,428,368 A | 1/1984 | Torii | |
| 4,900,316 A | 2/1990 | Yamamoto | |
| 5,003,966 A | 4/1991 | Saka et al. | |
| 5,377,701 A | 1/1995 | Fang | |
| 5,377,702 A | 1/1995 | Sakurai | |
| 5,593,381 A | 1/1997 | Tannenbaum et al. | |
| 6,099,463 A | 8/2000 | Hockhalter | |
| 6,319,211 B1 * | 11/2001 | Ito | A61M 1/0047 132/320 |
| 6,464,653 B1 | 10/2002 | Hovland et al. | |
| 6,733,438 B1 * | 5/2004 | Dann | A61H 19/34 600/38 |
| 7,079,898 B2 * | 7/2006 | Cohn | A61F 7/007 601/18 |
| 2001/0041848 A1 | 11/2001 | Ito et al. | |
| 2002/0120219 A1 | 8/2002 | Hovland et al. | |
| 2002/0198488 A1 | 12/2002 | Yao | |
| 2003/0114804 A1 | 6/2003 | Putzer | |
| 2003/0176817 A1 * | 9/2003 | Chang | A61H 23/02 601/9 |
| 2004/0236254 A1 | 11/2004 | Nichols | |
| 2004/0260209 A1 * | 12/2004 | Ella | A61B 18/203 601/7 |
| 2005/0159684 A1 | 7/2005 | Ikadai | |
| 2005/0159760 A1 * | 7/2005 | Ikadai | A61M 1/0058 606/131 |
| 2006/0089572 A1 | 4/2006 | Byon | |
| 2006/0116612 A1 | 6/2006 | Drysdale | |
| 2007/0100259 A1 | 5/2007 | Nan | |
| 2008/0071138 A1 | 3/2008 | Mertens et al. | |
| 2008/0106896 A1 * | 5/2008 | Liu | A61H 9/0057 362/234 |
| 2008/0304984 A1 | 12/2008 | Chan | |
| 2008/0312674 A1 | 12/2008 | Chen et al. | |
| 2009/0048581 A1 | 2/2009 | Sebban | |
| 2009/0118573 A1 | 5/2009 | Tsao | |
| 2010/0298745 A1 * | 11/2010 | Liu | A61H 9/0057 601/12 |
| 2011/0295162 A1 * | 12/2011 | Chang | A61H 9/0057 601/6 |
| 2013/0012769 A1 | 1/2013 | Carlson | |
| 2013/0116503 A1 | 5/2013 | Mertens et al. | |
| 2014/0142374 A1 | 5/2014 | Makower et al. | |
| 2014/0309565 A1 | 10/2014 | Allen | |

FOREIGN PATENT DOCUMENTS

| | | |
|---|---|---|
| CN | 103961246 A | 8/2014 |
| DE | 582196 | 8/1933 |
| DE | 1463673 U | 2/1939 |
| DE | 1703184 U | 7/1955 |
| DE | 3222467 A1 | 12/1983 |
| DE | 9309994.0 | 11/1993 |
| DE | 4243876 A1 | 6/1994 |
| DE | 10011289 A1 | 9/2001 |
| DE | 19853353 C2 | 5/2002 |
| DE | 102004017702 A1 | 10/2005 |
| DE | 202012005414 U1 | 8/2012 |
| DE | 212013000027 U1 | 9/2014 |
| EP | 0365230 A2 | 4/1990 |
| EP | 1554947 B1 | 7/2005 |
| EP | 2042147 A1 | 4/2009 |
| EP | 2712601 A1 | 4/2014 |
| JP | 53135768 | 11/1978 |
| JP | 53149442 | 12/1978 |
| JP | 54115952 B2 | 9/1979 |
| JP | 57099986 A | 6/1982 |
| JP | H05037234 U | 5/1993 |
| JP | 2000197518 A | 7/2000 |
| JP | 2008-125577 | 6/2008 |
| WO | 9205758 A1 | 4/1992 |
| WO | 00/28939 A2 | 5/2000 |
| WO | 2004004610 A1 | 1/2004 |
| WO | 2006058291 A2 | 6/2006 |
| WO | 2008028076 A2 | 3/2008 |
| WO | 2013178223 A2 | 12/2013 |
| WO | 2014131110 A1 | 9/2014 |
| WO | 2015039787 A1 | 3/2015 |

OTHER PUBLICATIONS

"Valve." Merriam-Webster.com. Merriam-Webster, 2016. Web. Dec. 26, 2016.*
"Pump." Merriam-Webster.com. Merriam-Webster, 2016. Web. Dec. 26, 2016.*
"Sex hilft gegen Erkältung," Focus Online, Dec. 5, 2004, 2 pages.
Beate Lakotta, Schmerz und Glückseligkeit, Der Spiegel, pp. 136-138, Jun. 2006.
"Gesundheitsminister: Mehr Sex gegen Bluthochdruck," http://www.heilpraxisnet.delnaturheilpraxis/sex-gegen-bluthochdruck-665.php, Apr. 27, 2010.
International Search Report and Written Opinion mailed on Sep. 25, 2014, in connection with International Patent Application No. PCT/EP2014/065734, 13 pages.
International Search Report and Written Opinion mailed Jul. 22, 2016, in connection with International Patent Application No. PCT/EP2015/067017, 22 pages. English translation not available.
Maria M. Kettenring, "Erotische Partnermassage", Gräfe und Unser Publishers, 2004, 4 pp.

* cited by examiner

STIMULATION DEVICE

CROSS-REFERENCE TO RELATED APPLICATIONS

This application is a national stage (under 35 U.S.C. 371) of International Patent Application No. PCT/EP2014/065734, filed Jul. 22, 2014, which claims priority to German Patent Application No. 102013110501.7, filed Sep. 23, 2013, both of which are herein incorporated by reference in their entirety.

The present invention relates to a stimulation device for erogenous zones, in particular for the clitoris, a system with a stimulation device, as well as to methods for stimulating body parts.

The erogenous zones of the human body can be stimulated with a variety of tools. For example, vibrators are used to apply a stimulus to a particular area of the skin by direct contact. However, this form of stimulation can lead to irritations or inflammations of the skin. Also, direct contact of the genital area with such tools for individual reasons of hygiene or due to personal reservations, for example, may not be desired.

In particular, the direct stimulation of the clitoris with a clitoral massage vibrator, for example, is fraught with problems, as the clitoris is usually a woman's most sensitive erogenous zone. The entire clitoris is equipped with numerous nerve endings, thus making it particularly touch-sensitive and responsive to sexual stimuli. Here, the clitoris glans, in which the nerve cords of the two thighs meet, should be particularly emphasized. Frequent use of a clitoral massage vibrator for direct stimulation, for example, leads to habituation effects or conditioning of the stimulated erogenous zone and the initial use of such a device may require certain practice or familiarization.

Furthermore, medical studies conducted in 2006 determined the female clitoris as definitive starting point of the female climax and neurologically proved the different qualities of sensation of clitoral (and vaginal) orgasm for the first time. Thus, according to the most recent medical research, the stimulation of the clitoris, rather than the vagina, is considered the starting point of a woman's sexual arousal and thereby the key to female "sexual pleasure".

The sensitivity of the human erogenous zones, such as the clitoris, the inner and outer labia or the nipples, continues to differ greatly individually. The person may be so sensitive that direct stimulation is only possible after prolonged foreplay, and even then only very subtly or ruled out completely. Furthermore, the sensitivity of the corresponding zone can change dramatically from one situation to another or even during a sexual act.

For the aforementioned reasons, various indirect forms of stimulation are common practice as alternatives to direct stimulation.

For indirect stimulation of erogenous zones, and especially the clitoris, conventional vacuum devices are used to arouse the erogenous zones of the person concerned without directly contacting the main area to be stimulated. Thus, for example, vacuum pumps for the primary or secondary female sexual organs are known, which usually have a suction cup for placing on the appropriate area and a hand pump. The negative-pressure exerted by this type of device on the clitoris, for example, generates a negative pressure in the clitoris itself, which is usually lower than the systolic blood pressure. This difference in pressure leads to an enlargement of the clitoris and/or stimulates the blood flow in the affected area. This vascular clitoral engorgement serves both to promote desire by increasing sensitivity and for optical and tactile manipulation. The improved blood circulation also leads to an increased leakage of vaginal moisture which makes the stimulation more pleasurable. However, the manual operation of the hand pump is often annoying or distracting. In addition, the long-term or uninterrupted use of negative-pressure in this device category may lead to habituation effects, which limit the effectiveness of the device in the long run. Moreover, a pure increase in the clitoral blood flow is often insufficient to reach a climax; vacuum pumps are thus often used only as foreplay to achieve the climax with a subsequent direct (pressure) massage of the erogenous zone.

Electrically driven vacuum pumps are also used increasingly instead of manually operated vacuum pumps as well. As an example of this, WO 2006/05 82 91 A2 discloses a device for sexual therapy, wherein the arrangement consists of a tubular suction chamber for the clitoris, an electric vacuum source (vacuum pump) and a plurality of airflow openings. The operation of the vacuum pump generates a permanent airflow or air exchange in the chamber in the area of the clitoris. This has the disadvantageous effect of suctioning the increasingly leaking vaginal moisture caused by the negative-pressure, thus having a drying effect on the stimulated parts of skin. Likewise, the suctioned moist air leads to a contamination of the fluidic subsequent vacuum arrangement, of the vacuum pump for example. Such arrangements with vacuum pumps may thus be hygienically problematic, as vacuum pumps and the associated valves or ventilation components often have dead spaces or blind spots and/or are difficult to clean. Furthermore, the device is meant to treat the blood vessels in the clitoris and not to provide stimulation up to sexual climax.

U.S. Pat. No. 6,099,463 A discloses a clitoris stimulation device with a tubular suction chamber, a vacuum source or a vacuum pump and a plurality of valves, which are used to control the size of the vacuum. The vacuum can also be in cyclic form to achieve a stimulation effect, although habituation effects are also to be expected with this device due to the use of a permanent vacuum. As explained above, the disadvantages relating to hygiene and the dehydration of the skin part to be stimulated are also present here. Likewise, the pressure-related arrangement with a plurality of valves, vacuum pump, etc. is relatively complex.

U.S. Pat. No. 6,464,653 B1 discloses therapeutic devices and methods to generate a clitoral engorgement with the aid of a vacuum generated by a vacuum pump to assist in the treatment of clitoral disorders, such as incontinence. A control valve or modulator that can be correspondingly covered by a finger is used to manually adjust or vary the amount of vacuum in the suction chamber. This requires the user's attention and may be distracting or diverting under certain circumstances. This relatively complex device with additional valves also has the same disadvantages relating to hygiene and dehydration as explained above, although the device is also used for long-term therapeutic purposes and not for short-term sexual stimulation.

WO 2008/02 80 76 A2 discloses a therapeutic device for women, which is mainly dedicated to treating sexual disorders. The device includes a combination of indirect stimulation by means of a vacuum chamber and direct stimulation by means of mechanical vibrators and oscillators.

The negative-pressure in this therapeutic device is used to increase the blood flow in the clitoris, while the area of skin is actually stimulated or massaged by means of direct mechanical vibrations/oscillations. Thus, a suction cup for placing on the area of skin to be stimulated is internally connected with a motor via a mechanical connection. The suction cup is extended by the motor once the device is activated, thus increasing the volume of the suction cup. The resulting volume of the suction cup and thus the strength of the vacuum can be adjusted by means of control elements on the device. The air displaced in the device by the suction process is discharged outwardly again via a pipe. The vacuum in this device has only a supporting function, while the actual stimulation ensues directly, which also entails the same disadvantages of a direct stimulation as explained above.

US 2013/001 276 9 A1 discloses a device in which a pulsating positive-pressure is used for stimulating an air pressure massage. A pump or compressor thus generates a pulsating positive-pressure, which is directed towards the erogenous zone to be stimulated by means of a nozzle. This device disadvantageously causes the affected area of skin to dry out severely or completely. Likewise, there is usually a temperature difference between the temperature of the supplied air and the temperature of the area of skin to be stimulated, which may be felt to be distracting under certain circumstances. The same problems of hygiene as explained above also occur in this device, although in this case any pathogens or germs or other contaminations located in the device are also transported directly to the user's genital area.

Thus, the prior art devices all have the same disadvantage in common, in that the complexity of the arrangements generating negative-pressure or positive-pressure may be high and this device may have problems of hygiene.

Furthermore, the prior art devices have another disadvantage in common, in that habituation effects occur in the event of constant or frequently recurring use of negative-pressures.

Another disadvantage of some of the previously described vacuum devices is, firstly, that the negative-pressure has to be limited by means of a control valve or a vacuum pump and, secondly, that the negative-pressure is supposed to be reduced by means of a manual opening of a release valve, before the suction cup is peeled from the skin. Should one of the valves have a technical defect and/or the user operate the device incorrectly, there may be a risk of injury in certain circumstances.

Thus, in view of the problems as explained above, the problem addressed by the invention is to provide a stimulation device with a simple construction that is easy and safe to use.

Another problem addressed by the present invention is to provide a stimulation device with an effective stimulation-triggering effect, which is suitable for stimulating an erogenous zone, especially the female clitoris.

In addition, partial problems addressed by the invention are to provide a device, which prevents the erogenous zones to be stimulated from drying out, is hygienic and prevents habituation effects.

The problem addressed by the invention is solved by the stimulation device described herein. Advantageous developments and embodiments are also described herein.

According to the invention, a pressure field generator in the stimulation device has at least one first chamber and at least one second chamber with at least one opening for placing on a body part or on the erogenous zone and at least one connection element that connects the first chamber with the second chamber.

This embodiment of chambers according to the invention communicating in a fluidic manner via at least one connection element allows the first chamber to simply generate a pressure field in the second chamber by modifying the volume in the first chamber, which is occasionally directed at the area of skin to be stimulated.

A pressure field in terms of the invention is a temporally modifiable field of media pressures, with occasional positive-pressures and occasional negative-pressures, a negative-pressure being a media pressure below the reference pressure and an positive-pressure being a media pressure above the reference pressure.

The medium is usually gaseous, preferably air, but may alternatively or additively, for example, be a liquid medium, such as water or commercially available lubricant. For example, the chambers according to the invention may be filled with the lubricant prior to using the stimulation device. This allows the corresponding area of skin to be stimulated with a suitable skin-friendly liquid in lieu of air as well, whatever the user's individual preference. As another example, the stimulation device may also be used under water with water as the medium (in the bathtub, for example).

The reference pressure is usually the existing ambient pressure in relation to the stimulation device at the beginning of use (i.e. prior to placing the stimulation device on the area of skin to be stimulated). In the preferred use of the stimulation device with air, the reference pressure is the currently existing air pressure or normal pressure.

The pressure field according to the invention excites the blood circulation of the area of skin to be stimulated, while said area of skin is indirectly massaged, thus combining two advantageous effects. The increased blood circulation makes the erogenous zone of the person concerned more sensitive, while generating an additional massage effect that serves, for example, to stimulate the erogenous zone to sexual arousal up to climax. The massage effect is generated by the kinetic energy of the medium flowing out of the first chamber through the connection element against the surface of the area of skin to be stimulated. The massage effect generated in this way is indirect, i.e. without the area of skin to be stimulated being contacted by a solid body, such as a vibrator, which results in the avoidance of the initially explained disadvantages of direct stimulation.

By the exemplary use of the temporally modifiable pressure field according to the invention on the clitoris, the pressure field imitates a stimulation that usually only occurs during sexual intercourse. Likewise, the cohabitation movement generates a varying stimulus on the clitoris. It is thus a true-to-life imitation of the natural act of cohabitation, with medical statements confirming that the use of the pressure field according to the invention causes neither habituation effects nor addiction. This is due in particular to the alternating use of negative- and positive-pressures (or even to the non-continuous use of only one type of pressure).

Furthermore, the maximum applicable pressure is regularly limited by the maximum resilience of the area of skin to be stimulated. Thus, for instance, too high a negative-pressure harbors the risk of painful injury, especially in erogenous zones. Only stimulation devices working with negative-pressures are usually limited to this maximum in their mode of operation. Conversely, the combination of positive- and negative-pressures according to the invention creates an extended working area of the stimulation-triggering pressure field or effect, as the working area of the pressure can now be exploited to the maximum in both the positive and negative area.

The orientation of the at least one connection element towards the area of skin to be stimulated allows the pressure field to work directly, wherein the pressure field is decisively influenced by the configuration of the at least one connection element and of the at least one opening from the connection element into the second chamber, and is thus adjustable after every use of the stimulation device. Thus, for example, the at least one opening of the connection element may be located opposite and preferably directly opposite the body part to be stimulated. For example, the connection element in a stimulation device intended for the clitoris may have a single passageway with nozzle effect on the clitoris glans between the first and second chamber. Alternatively, the at least one connection element may consist of a plurality, for example four, of passageways between the chambers, if a larger area of skin is to be stimulated.

Furthermore, after placing the halfway or partially opened second chamber on the area of skin to be stimulated, a self-contained system of media- and airflow is created in the pressure field generator. Thus, for instance, the medium or air is moved decisively backwards and forwards between the chambers, while an interchange with media or with air from outside the system being at least largely avoidable. Thus, the first chamber is preferably connected exclusively with the second chamber via or through the connection element. Thus, no first chamber connections other than those to the second chamber exist; for example, there is no direct first chamber connection to the environment of the device via a pressure valve or via an air discharge channel.

For example, the air temperature in the flow system according to the invention rapidly adjusts to the skin temperature, while the distracting supply of new (possibly cold) air from outside the system is avoided, as may be the case, inter alia, when using vacuum pumps in prior art. Drying effects are also avoided, as very little or no removal of stimulation-promoting fluid, such as bodily fluid, occurs in a closed system.

Furthermore, due to the simple construction, the pressure field generator according to the invention has the advantage of increased hygiene and improved cleanability. The present invention thus avoids valves or pumps/compressors with potential dead spaces and places that cannot be cleaned. The pressure field generator according to the invention is thus easy to clean. For example, the stimulation device can be simply cleaned by filling the first chamber with a cleaning agent and activating the pressure field. Alternatively, the second chamber can be arranged to be replaceable, which also simplifies the cleaning of both chambers. Furthermore, the chambers according to the invention and the connection element of the pressure field generator can be designed in one-piece, wherein the latter consists of a single molded plastic part (e.g. rubber).

In addition, the construction according to the invention avoids complex fluidic elements, such as valves, which leads to a simplification in production.

Furthermore, the stimulation device according to the invention has a drive unit, which modifies the volume in the first chamber in such a way that a pressure field is generated via the connection element in the second chamber that serves to stimulate the erogenous zone, and has a control device that activates the drive unit.

As a matter of principle, the medium transported between the chambers is limited to the maximum volume of the first chamber. In addition, the transported volume can be further constructively limited by the maximum possible volume modification caused by the drive unit.

This means that the maximum positive- or negative-pressure the stimulation device can build up in the second chamber is limited due to the dimensioning of the components of the pressure field generator and of the drive. In particular, the maximum positive- or negative-pressure can be limited to degree that minimizes or excludes any risk of injury for the areas of skin to be stimulated. As a result, any conventional safety valve in prior art or any manual intervention in the stimulation process by the user, such as the opening of a release valve, is rendered unnecessary.

Furthermore, the temporal modification of the pressure field or the modification of the pressure field by the control device is automatically controlled to a large extent. Thus, for example, the modulation of the pressure field, such as intensity, chronological sequence or evolvement, can be pre-saved in the control device. As a preference, the temporal modification of the pressure field can have a regular or reoccurring (stimulation) pattern, such as impulses with a stipulated cycle or regularly alternating impulse sequences. This allows the user's interaction with the stimulation device according to the invention to be limited to switching on and off and selecting the stimulation pattern, while the stimulation device automatically executes the preferred stimulation pattern. Thus, according to the invention, the user complexity of the stimulation-device is low, especially when compared with conventional (medical) vacuum stimulation devices. Alternatively, or additionally, the simulation pattern of the stimulation device can be individually configured by the user during or before operation.

Another aspect of the invention proposes a system comprising the stimulation device, which has a remote control device arranged separately from the stimulation device, wherein the control device of the stimulation device is remotely controlled by the remote control device. This allows a conventional wireless (via radio for example) or wired remote control to be employed, in order to allow the remote controlled moderation of the stimulation device or the activation thereof by another user.

Another aspect of the invention proposes a method for stimulating body parts, especially the clitoris. The associated advantages effects and impacts are explained in more detail above in relation to the pressure field.

Another aspect of the invention proposes the use of the stimulation device according to the invention as a sex toy for stimulating the female clitoris. As explained at the beginning, the female clitoris is an especially erogenous zone of women, which is why the use according to the invention of an indirect massage combined with a negative-pressure stimulation for this body part to provide stimulation up to orgasm seems particularly advantageous.

The above-described features and functions of the present invention as well as other aspects and features are further described in the following with the aid of a detailed description of preferred embodiments with reference to the enclosed illustrations.

DESCRIPTION OF PREFERRED EMBODIMENTS

Figure 1:
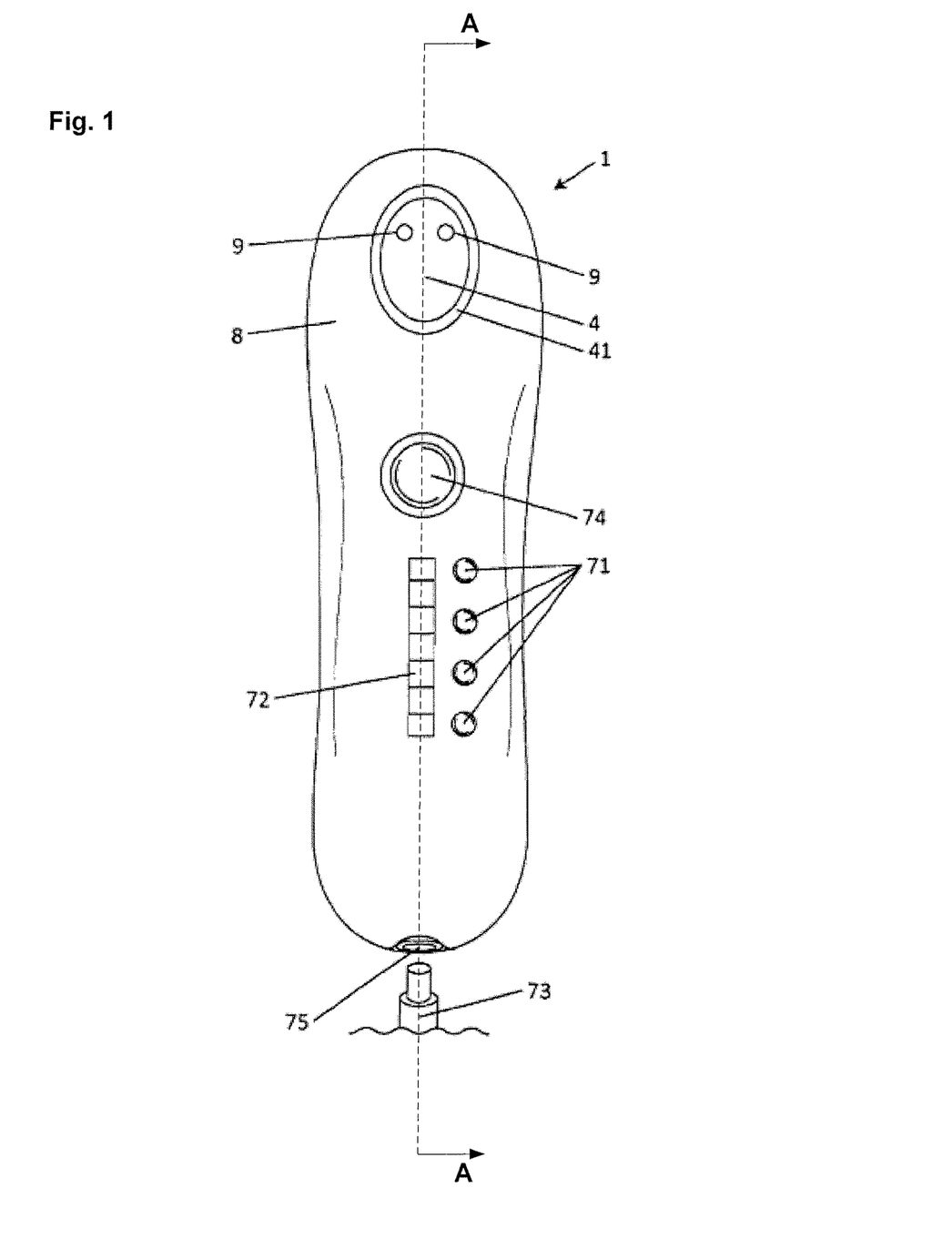
FIG. 1 a front view of a first embodiment of the stimulation device according to the invention.
Figure 2:
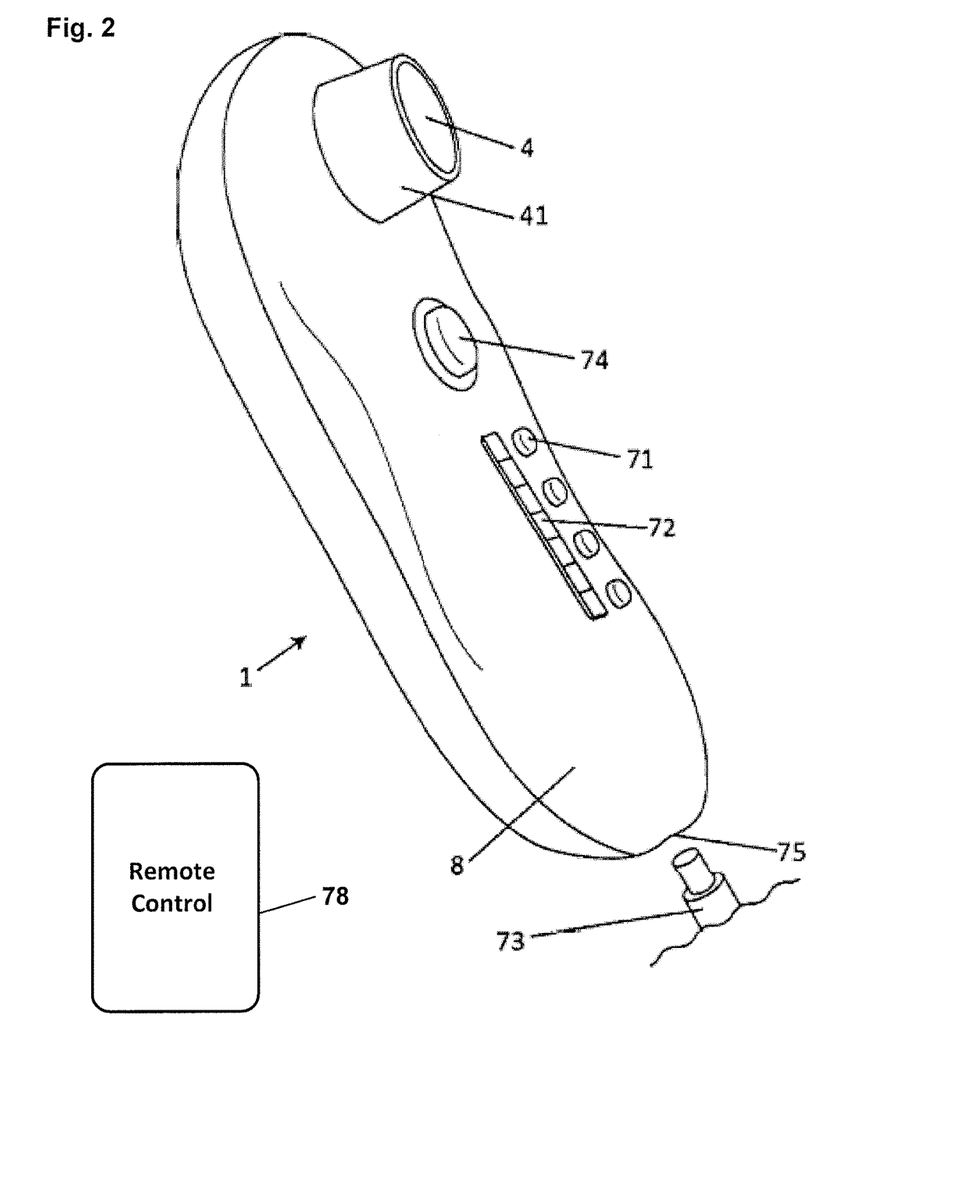
FIG. 2 a perspective side view of the first embodiment of the stimulation device according to the invention.
Figure 3:
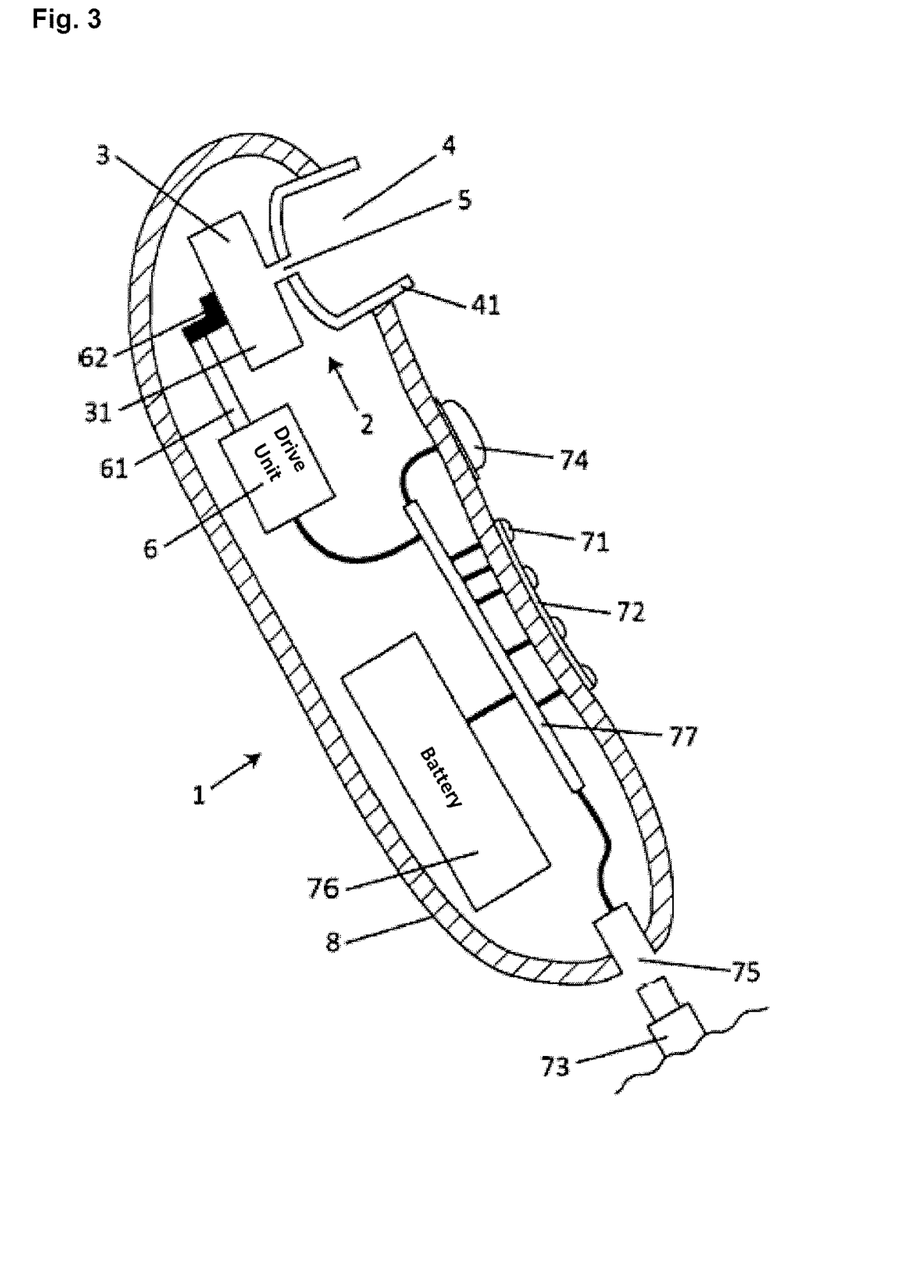
FIG. 3 a cross-section through section A-A of the first embodiment of the stimulation device shown in FIG. 1 according to the invention.

With reference to FIG. 1, a front view of a first embodiment of stimulation device 1 is explained, wherein FIG. 2 shows a perspective view and FIG. 3 a cross-section of the first embodiment of stimulation device 1 according to the invention.

The first embodiment of stimulation device 1 is a preferably electric or small device, comprising a housing 8, a pressure field generator 2, operating elements 71, a display 72, an on/off switch 74, a socket 75, an optional battery 76 and optional lighting 9.

Housing 8 is preferably designed so ergonomically that it can be held comfortably in one hand and has no sharp or pointed edges. Furthermore, housing 8 may consist of plastic, such as polycarbonate (PC) or acrylonitrile butadiene styrene (ABS). In addition, the gripping areas or even the entire housing may be supplemented by or designed in a haptically advantageous silicone. Housing 8 is preferably designed to be at least water-resistant or splash-proof, for example protection class IP 24.

Operating elements 71 are used to adjust the device operating mode, i.e. to adjust the pressure field modulation pattern. Operating elements 71 can, for example, be designed as at least one pushbutton, as at least one rotary switch, or as at least one touch-sensitive switch. Furthermore, operating elements 71 can produce an optical feedback for activating light emitting diodes (LED) integrated in the center of the switch, for example.

An optional display 72 serves to inform the user of the device status and/or the setting status. Display 72 can for example be configured as a plurality of light diodes or as an LCD display. The displayed information can, for example, be the charge status of an optional battery or the current setting of the modulation pattern.

On/off switch 74 is used for activating and deactivating stimulation device 1. This on/off switch 74 can, for example, be a pushbutton, which switches stimulation device 1 on or off when held down, or a ratcheting slide switch.

A socket 75 is used to supply the external power of stimulation device 1 via an external plug 73, which is connected to an external power adapter, for example. To ensure stimulation device 1 is splash-proof, a magnetic-inductive transformer may be provided instead of the socket, which allows power to be transmitted to stimulation device 1 without any electroconductive contact. Stimulation device 1 preferably also has a battery, such as a nickel metal hydride battery (NiMH) for wireless operation. Alternatively, a (longer) power supply cable may also be led out of the stimulation device.

Pressure field generator 2 of a first embodiment has a first chamber 3 in the interior of stimulation device 1, a second chamber 4 for placing on a body part 11 to be stimulated, and a connection element 5, which connects the first chamber 3 with the second chamber 4.

A drive unit 6, such as an electric motor, drives the first chamber 3 via an axis 61 and by means of an eccentric 62 (or alternatively by means of a connecting rod) in such a way that the volume of the first chamber 3 is modified according to the rotation of axis 61 of drive unit 6. It is hereby annotated that any drive types causing a deflection in wall 31 of the first chamber 3 for volume modification can basically be used in stimulation device 1. The latter may, for example, occur hydraulically, pneumatically, piezoelectrically, mechanically or electromagnetically. Examples of this are described in more detail later on.

A control device 7 activates drive unit 6, operating elements 71 and display 72. Control device 7 and drive unit 6 are supplied with power by internal battery 76 and/or external power supply 73. Control device 7 of stimulation device 1 may be remotely controlled by remote control device 78.

Optional lighting 9 is provided on or in housing 8. Lighting 9 is preferably used for lighting the interior of the second chamber 4. Lighting 9 can either be switched by the user or automatically activated by activating stimulation device 1. Furthermore, lighting 9 can be composed of energy-saving light diodes. The lighting can, for example, serve as an orientation aid in the dark for the user of stimulation device 1 or as additional optical stimulation.

Figure 4:
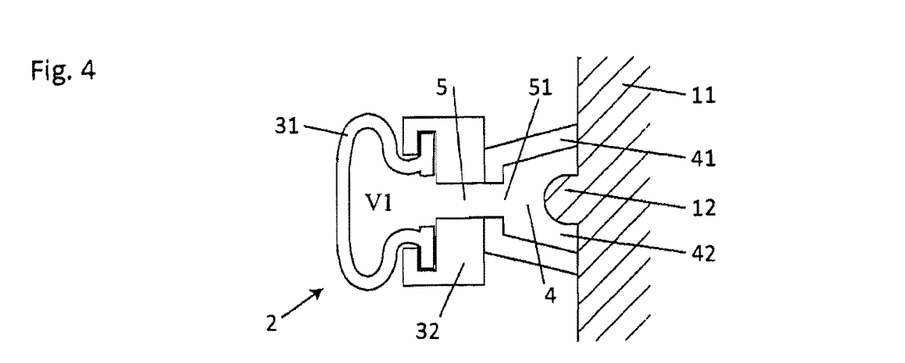
FIG. 4 a cross-section through section A-A of a pressure field generator of the stimulation device shown in FIG. 1 according to a first aspect of the present invention in the first state.
Figure 5:
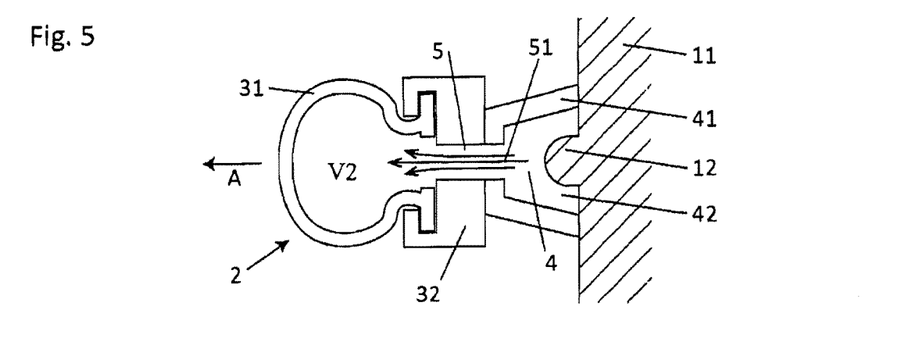
FIG. 5 a cross-section through section A-A of a pressure field generator of the stimulation device shown in FIG. 1 according to a first aspect of the present invention in the second state.
Figure 6:
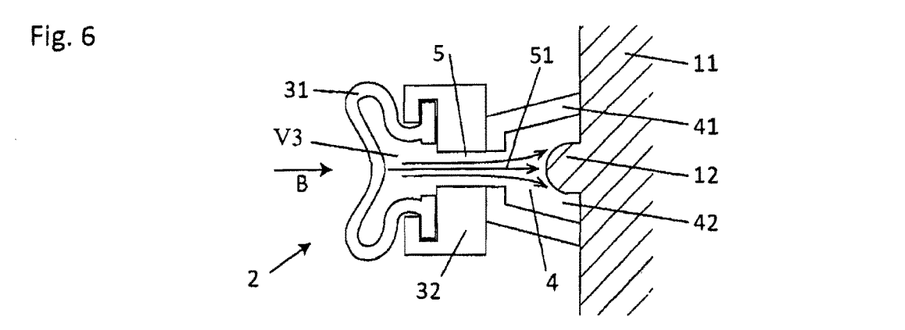
FIG. 6 a cross-section through section A-A of a pressure field generator of the stimulation device shown in FIG. 1 according to a first aspect of the present invention in the third state.

With reference to FIGS. 4, 5 and 6, the construction and function of a first aspect of pressure field generator 2 of stimulation device 1 is subsequently described in more detail.

FIG. 4 shows pressure field generator 2 in a first state, with the second chamber 4 being placed on the area of skin or body part 11 to be stimulated. The first state of pressure field generator 2 is characterized by a neutral deflection of the first chamber 3, i.e. no external force is exerted on the first chamber 3, for example, by the drive unit. Here, volume V1 of the first chamber is the standard volume of this chamber 3.

The body part 11 to be stimulated is an area of skin on the body, wherein for example an especially sensitive erogenous zone, clitoris 12, is shown. The use of the present invention is thus not limited to the female clitoris 11, instead stimulation device 1 can be used on all body parts or erogenous zones (such as the inside of the upper thighs, the loins, neck, nipples, etc.), which can be stimulated by means of media- or air-pressure massage and/or negative-pressure.

Due to being placed on the body part 11 to be stimulated, the second chamber 4 forms a chamber largely or completely sealed off from the exterior of pressure field generator 2, which is only still connected to the second chamber via connection element 5, wherein the edges of chamber 4 ideally form an air-tight bond with the surface of body part 11. Two communicating chambers 3 and 4 are created in this way, wherein corresponding pressure equalization via connection element 5 ensues between chambers 3 and 4 in the event of a volume modification in one of chambers 3 or 4.

Wall 31 of the first chamber 3 is secured by means of a holder 32. Holder 32 is in turn attached to housing 8. Wall 41 of the second chamber is further affixed to holder 32. Two mutually aligned openings in wall 41 of the second chamber and of holder 32 jointly form connection element 5, which connects the first chamber 3 and the second chamber 5. Wall 31, holder 32 and wall 41 are preferably adhered to each other media- or air-tightly. Alternatively, the latter can also be press-fitted or screwed together with each other (for example by means of sealing areas between housing 8 and the respective part). Holder 32 can also be adhered or screwed onto housing 8, for example.

Wall 31 of the first chamber 3 preferably consists of a flexible media- or airtight material, such as rubber. Holder 32 preferably consists of a rigid plastic, which is just as media- and airtight. Wall 41 of the second chamber is preferably made of a flexible, skin-friendly material, such as silicone or rubber.

FIG. 5 shows pressure field generator 2 of FIG. 4 in a second state, wherein the second chamber 4 is in turn placed on the body part 11 to be stimulated. The second state is characterized in that a force A affecting the first chamber 3 causes chamber 3 to expand. In detail, force A in this embodiment draws wall 31 of the first chamber 3 in a direction facing away from the second chamber 4.

Volume V2 in chamber 3 increases as a result, i.e., V2>V1. To equalize the difference in pressure created between chambers 3 and 4, the media or air now flows from the second chamber 4 into the first chamber 3.

Assuming that the first state of the present pressure in chambers 3 and 4 corresponds to the currently prevailing external reference pressure (air pressure for example); the present overall pressure in the second state will now be less than the external reference pressure. This negative-pressure is designed in such a way that it is preferably less than the usual systolic blood pressure in the blood vessels of body part 11. The blood circulation in this area thus increases and clitoris 12 is better supplied with blood in the second state.

FIG. 6 shows pressure field generator 2 in a third state, wherein the second chamber 4 is in turn placed on the body part 11 to be stimulated. The third state is characterized in that a force B influencing the first chamber 3 causes a volume reduction or compression in chamber 3. In detail, the direction of force B is opposed to the direction of force A and distorts wall 31 of the first chamber in such a way that the resulting volume V3 of the chamber is less than volume V1. The compression of chamber 3 causes an positive-pressure in chamber 3, which is equalized by a media- or airflow through connection element 5 in the direction of the second chamber 4.

This media flow is now preferably directed by the orientation of opening 51 and/or of connection element 5 towards the body part 11 to be stimulated, in particular towards the glans of clitoris 12. The indirect (pressure) massage according to the invention ensues due to the medium flowing onto body part 11. The size of opening 51 is dimensioned in such a way that it is small enough in ratio to the volume displaced in the first chamber 3 to sufficiently accelerate the medium for a perceptible massage effect.

Furthermore, the type of flow can not only be advantageously influenced by the size and orientation of opening 51, but also by the inner configuration of the connection element. For example, helix-shaped grooves in connection element 5 can cause the flow according to the invention to swirl, wherein the flow profile of the flow unfurls a "softer" or more turbulent effect on the body part to be stimulated. Alternatively, the resulting pressure field in the second chamber 4 can be adjusted by means of a plurality of openings 51, depending on use.

The advantageous factor of the arrangement shown in FIGS. 4 to 6 is that it is hygienically unproblematic (due to the avoidance of dead spaces, for example) and is simple to produce. For example, no valves or other openings in or on the first chamber 3 are required.

Figure 7:
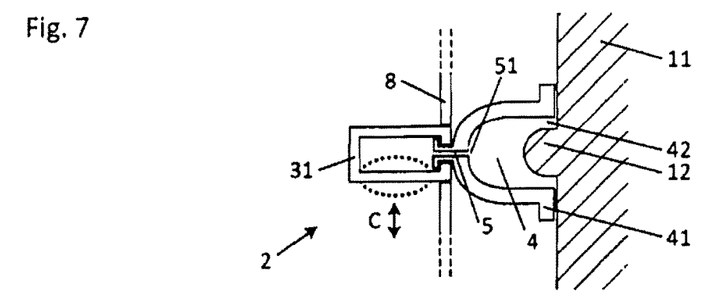
FIG. 7 a cross-section through section A-A of a pressure field generator of the stimulation device shown in FIG. 1 according to a second aspect of the present invention.

FIG. 7 shows a second aspect of the present invention with an alternative construction of pressure field generator 2. Walls 31 and 41 of the first and second chambers 3 and 4 respectively can thus engage with one another in such a way that they also form two communicating chambers with a connection element 5, as in the first aspect of the construction of pressure field generator 2. Thus, the separate holder is no longer required, while the second chamber 4 is replaceable. In addition, connection element 5 can be designed integrally or in one-piece with wall 41 of the second chamber 4. A replaceable chamber 4 has the advantage of allowing the use of any shapes of chamber 4 adjusted to the respective body part (a more detailed description thereof is provided later), without the entire stimulation device 1 needing to be replaced. Alternatively, the second chamber 4 can also be pluggably affixed to housing 8 (not shown in more detail). Wall 31 of the first chamber 3 can be adhered or screwed onto housing 8, for example.

Also, as shown in more detail in FIG. 7 by the broken line and double arrow C, the first chamber 3 is expanded and compressed by a force exerted perpendicularly to the axial direction of connection element 5. In principle, the force exerted directly or indirectly on the first chamber 3 by drive unit 5 can be exerted from any direction. The only decisive criterion here is that the volume of the first chamber 3 can be increased and decreased by drive unit 6.

Figure 8:
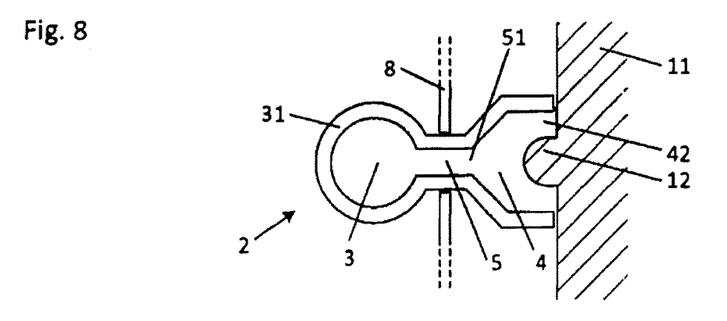
FIG. 8 a cross-section through section A-A of a pressure field generator of the stimulation device shown in FIG. 1 according to a third aspect of the present invention.

FIG. 8 shows a third aspect of the invention with an integral or one-piece structure of pressure field generator 2. An elastic material, such as silicone or rubber, can be used as material for chambers 3 and 4. The advantage here is that any hygienically unsafe divide is avoided and the production effort is reduced. Pressure field generator 2 can be adhered or screwed onto housing 8 in this case too. Any modification of the volume in the first chamber 3 is analogous here, as described in conjunction with FIG. 7.

Figure 9:
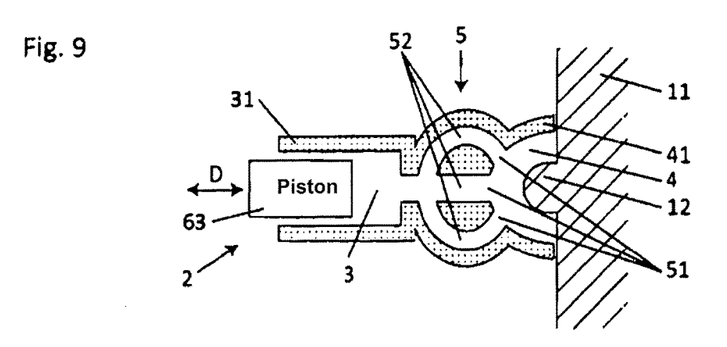
FIG. 9 a cross-section through section A-A of a pressure field generator of the stimulation device shown in FIG. 1 according to a fourth aspect of the present invention.

FIG. 9 shows a fourth aspect of the invention with an alternative construction of pressure field generator 2. The second chamber 4, a plurality of connection elements 5, as well as partial sections of wall 31 of the first chamber 3 are designed in one-piece. Alternatively, pressure field generator 2 can be constructed in two or more pieces from individual components, while safeguarding the geometrical example of FIG. 9 in a similar way to that shown in FIG. 4 or 7.

The volume in chamber 3 is modified in a similar way to a piston pump, although no valves are available here. A piston 63 is thus moved backwards and forwards by the drive unit, for example an electric motor or electromagnet, in the directions of the double arrow D. This type of drive has the advantage that the volume of the first chamber 3 can be simply reduced to zero or almost zero, thus allowing the first chamber 3 to be almost completely emptied.

The embodiment of connection element 5, with a plurality of channels 52 and openings 51, leads to a distribution of the pressure field to a plurality of concentration points. While the embodiment of connection element 5 with only one channel, as described in conjunction with FIG. 6, leads to the formation of a strongly concentrated media- or airflow on a target area, the embodiment of connection element 5 shown in FIG. 9 allows the media- or airflow to be distributed to a plurality of target areas, thus allowing clitoris 11 to be blown not just on its glans, but equally from a plurality of directions as well, for example. Depending on use, this distribution of the airflow concentration to a plurality of areas can help to avoid any overstimulation and/or help to increase the stimulation area.

Figure 10A:
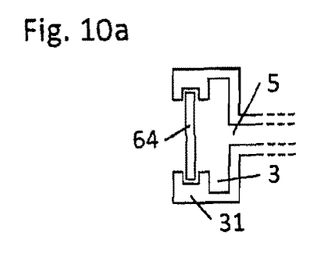
FIG. 10a), b) and c) cross-sections through section A-A of a pressure field generator of the stimulation device shown in FIG. 1 according to a fifth aspect of the present invention.
Figure 10B:
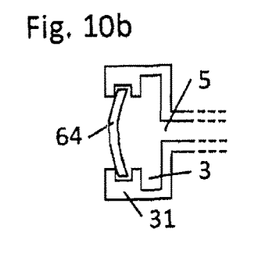
Figure 10C:
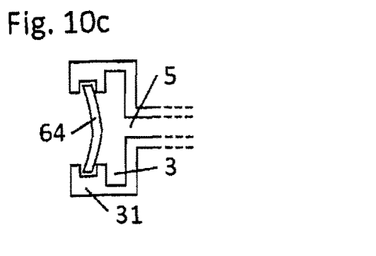

FIGS. 10 a to 10 c show a fifth aspect of the invention with (partial) cross-sections of a construction of pressure field generator 2 with a bending element 64 as drive for modifying the volume in the first chamber 3. Bending element 64 can, for example, be a conventional piezoelectric bending element, which distorts or bends once voltage is applied. In this aspect of the invention wall 31 of the first chamber 3 is a rigid or stiff construction, while bending element 64 is suitably dovetailed to the sides of the first chamber 3. The transition points between bending element 64 and wall 31 are sealed (elastically bonded for example). The drive for pressure field generator 2 is already integrated in this construction and an external drive is not required. An electric motor with an eccentric is not needed, for example. This allows, inter alia, the reduction of any disturbing natural oscillations due to the eccentric movement of the stimulation device.

In detail, FIG. 10 a shows pressure field generator 2 with bending element 64 in a neutral position. Thus, the volume of the first chamber 3 with bending element 64 in the neutral position is the standard volume. FIG. 10 b also shows the first chamber 3 with an excited and, consequently, outwardly bent bending element, while the volume of the first chamber 3 is increased, with a negative-pressure consequently prevailing in pressure field generator 2. FIG. 10 c shows a bending element of the first chamber 3 excited in the opposite direction to FIG. 10 b, which is why the volume in the first chamber 3 has decreased, with an positive-pressure consequently prevailing in pressure field generator 2.

Figure 11:
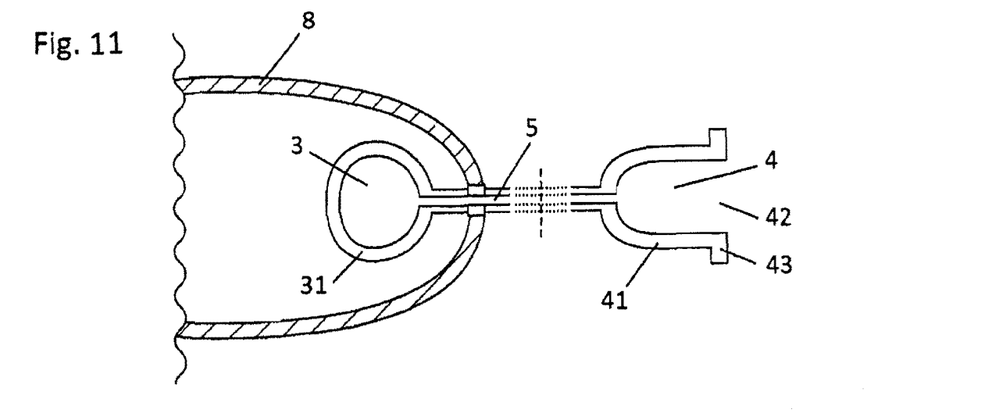
FIG. 11 a partial cross-section through section A-A of a second embodiment of the stimulation device of FIG. 1 according to the invention.

FIG. 11 shows a second embodiment of the invention with a locally separated arrangement of chambers 3 and 4 of pressure field generator 2. Chambers 3 and 4 are connected via an extended connection element 5, which can be a longer flexible hose or even a rigid pipe. For example, connection element 5 may be 0.5 m in length. This enables housing 8 to be held in one hand, while the other hand holds the second chamber 4 on the body part 11 to be stimulated; or one can simply lay housing 8 aside, while the user holds only the second chamber 4 in his/her hands. The stimulation device in this embodiment can also be designed as a table device.

FIGS. 12 a) to 12 f) show various bottom and side views of other aspects of the second chamber 4 of the present invention. In detail, FIG. 12 a) shows a bottom view of a circular second chamber 4 with a centrally arranged opening 51; FIG. 12 b) a bottom view of a triangular second chamber 4 with a centrally arranged opening 51; FIG. 12 c) a bottom view of an oval second chamber 4 with a centrally arranged opening 51; and FIG. 12 d) a bottom view of an almost eight-shaped second chamber 4 with two openings 51 shifted to the center. FIG. 12 e) further shows a side cross-section of a second chamber 4 according to the invention, wherein the second chamber 4 has an additional extended contact surface or sealing bearing part 43 to the skin or a support part 43 to improve the sealing function of the second chamber 4 on the skin. The extended contact surface 43 may also have grooves or projections that improve the sealing function even more. FIG. 12 f) shows a side cross-section of a second chamber 4 with a plurality of separate connection elements 5 and an extended contact surface due to support part 43.

In principle, the form of the second chamber 4 can thus be adjusted to the anatomy of the erogenous zone to be stimulated. The form of chamber 4 in FIG. 12 a) is, for example, adjusted to the round shape of the breast, while the form of chamber 4 in FIG. 12 c) is better suited to the form of the female vulva. Furthermore, the shape of the second chamber 4 also determines the characteristic of the pressure field according to the invention. The size of the second chamber 4 in ratio the volume displaced from chamber 3 thus determines the amount of the achievable negative- or positive-pressure. Furthermore, the proximity of opening 51 of connection element 5 to the area of skin to be stimulated can also be used to determine the intensity of the massage effect according to the invention on said area of skin. A plurality of openings 51, cf. FIG. 12 d) allows the massage effect to be distributed to a plurality of areas. Thus, for example, the clitoris can be less directly stimulated at the very sensitive clitoris glans (cf. FIG. 12 e), and more stimulated at the areas surrounding the clitoris glans, in order to prevent overstimulation of the clitoris.

Figure 13:
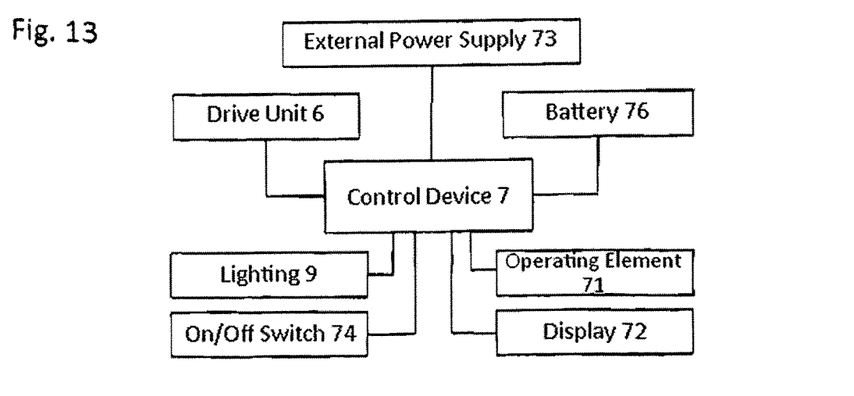
FIG. 13 a block diagram of an embodiment of the present invention.

FIG. 13 shows a block diagram of an example of the functional construction of an embodiment of the present invention with a control device 7, a drive unit 6, lighting 9, an on/off switch 74, operating elements 71, a battery 76 and an external power supply 73.

Control device 7, which has a microcontroller or is hardwired, for example, initially controls the power supply of all users of stimulation device 1, as well as an optional charging and discharging process of battery 76 and/or a battery management. In particular, control device 7 controls the excitation of drive unit 6, such as the size of the deflection, the frequency, the modulation, etc.

Figure 14A:
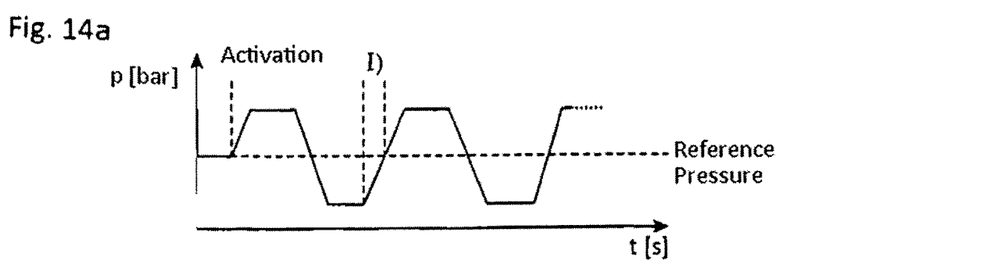
FIG. 14a) to c) Diagrams of various pressure modulation patterns of the present invention.

Furthermore, control device 7 may have a memory in which at least one modulation or stimulation pattern (described in more detail in conjunction with FIG. 14 a) to d)) is saved. The excitation of drive unit 6 can now be activated via operating elements 71 in compliance with the previously saved stimulation pattern at the discretion of the user of stimulation device 1. The stimulation pattern of the pressure field can also be optionally and individually adjusted and saved by the user via the operating elements.

FIG. 14 a) shows the chronological sequence of a total pressure p in the pressure field generator (2) when using the latter for stimulation. The broken line provides the reference pressure, such as the currently prevailing atmospheric pressure that exists outside the pressure field generator (2). If the second chamber 4 is now placed on body part 11 to be stimulated, the originally prevailing ambient pressure in the pressure field generator (2) is maintained, for example. It is now assumed that the second chamber 4 is sealed tightly to the body part to be stimulated for the most part. Once the stimulation device is activated, drive unit 6 is activated or excited by control device 7 according to a previously saved stimulation pattern. Accordingly, the volume of the first chamber 3 and thus the total pressure in pressure field generator 2 are modified, with the pressure modifications being modified to the reference pressure. The pressure or stimulation pattern shown as an example in FIG. 14 a) develops a pulsed, regular pressure field. In phases of pressure increase, the erogenous zone to be stimulated is blown on or massaged, while in the times when a negative-pressure prevails, the blood circulation of body part 11, the clitoris for example, is promoted. Thus, time periods according to the invention exist (designated in FIG. 14 a) as I)) in which a negative-pressure prevails, while the clitoris is simultaneously indirectly massaged.

Figure 14B:
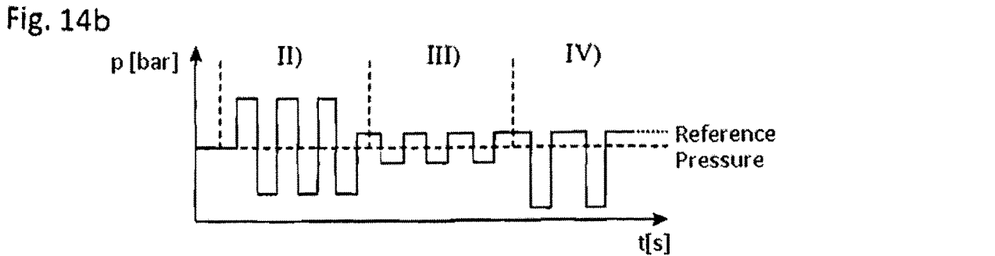

FIG. 14 b) shows three examples of alternative stimulation patterns. Thus, the area designated as II) shows a pulsed stimulation pattern with high amplitude. The area designated as III) shows a pulsed stimulation pattern with low amplitude. Furthermore, the area designated as IV) illustrates an irregular and asymmetrical stimulation pattern as regards chronological sequence and amplitude. The patterns can be varied according to individual bodily effect/use and according to individual wishes.

Figure 14C:
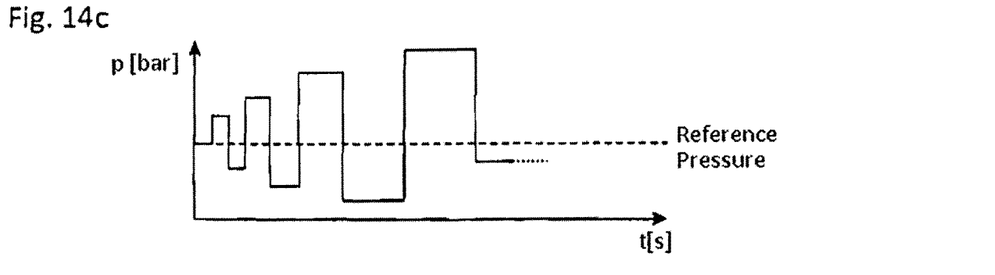

FIG. 14 c) shows another example of an alternative stimulation pattern. The strength of pressure may, for example, increase with time, in order to adjust to the user's state of excitement.

Figure 12A:
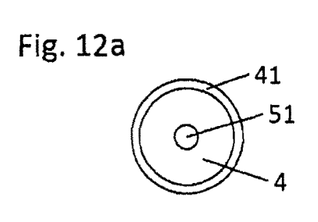
FIG. 12a) to f) various bottom and side views of other aspects of a second chamber of the present invention.
Figure 12B:
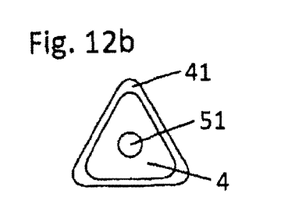
Figure 12C:
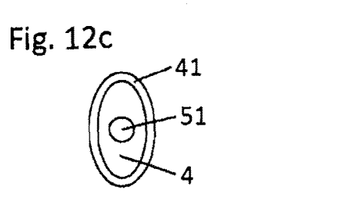
Figure 12D:
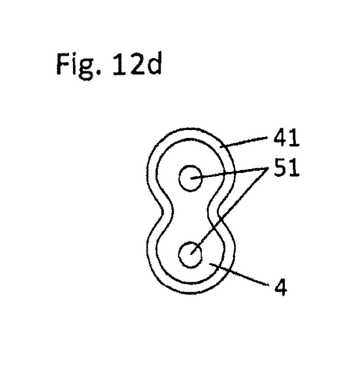
Figure 12E:
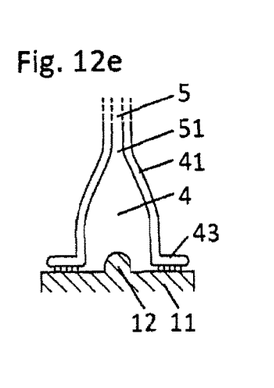
Figure 12F:
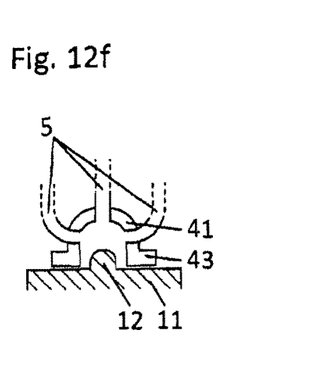

In addition to the explained embodiments, the invention allows other basic design principles. For example, different arrangements or constructions of the first chamber 3 may be arbitrarily combined with various embodiments of the second chamber 5 or connection element 5. For example, the first chamber 3 with the drive in FIG. 10 can be combined with the second chamber in FIG. 12 f).

Although only one first chamber 3 is shown in all embodiments, two or more first chambers 3 may be present, which are then appropriately activated simultaneously or time-delayed in such a way that their volume is modified in order to build up a pressure field according to the invention.

Although only one opening from the first chamber 3 to connection element 5 is shown in all embodiments, a plurality of openings for a connection element 5 or even more openings for a plurality of connection elements 5 may be present in the first chamber 3.

A stimulation device 1 can have a plurality of pressure field generator 2. Thus, for example, two pressure field generators may be available to stimulate two erogenous zones simultaneously.

The stimulation patterns according to the invention can deviate from the patterns shows in FIG. 14 a), b) and c), as long as they have a chronological sequence of over- and negative-pressures. For example, a relatively long-lasting negative-pressure can initially be built up at the beginning or after activation of the device (3 minutes for example), in order to effectively increase the blood circulation of the zone to be stimulated, whereupon pulsed negative- and over-pressures of a slowly increasing amplitude then follow.

LIST OF REFERENCE NUMERALS

1 Stimulation device
2 Pressure field generator
3 First chamber
4 Second chamber
Connection element
6 Drive unit
7 Control device
8 Housing
9 Lighting
11 Body part
12 Clitoris
31 Wall of first chamber
32 Holder
41 Wall of second chamber
42 Opening of first chamber
43 Contact surface
51 Opening of connection element to second chamber
61 Drive shaft
62 Eccentric
63 Piston
64 Bending element
71 Operating element
72 Display
73 Power supply
74 On/off switch
75 Socket
76 Battery
77 Control board
78 Remote control

The invention claimed is:

1. A stimulation device for a clitoris, comprising:
a pressure field generator comprising:
   a first chamber having a single opening;
   a second chamber having first and second openings, the second opening of the second chamber for placing over the clitoris; and
   a connection element having a first opening and a separate second opening thereby forming a straight channel connecting the single opening of the first chamber with the first opening of the second chamber;
a drive unit that changes a volume of the first chamber in such a manner that a stimulating pressure field is generated in the second chamber via the connection element; and
a control device that actuates
the drive unit; and a housing enclosing the pressure field generator, the drive unit, and the control device;
wherein:
   the pressure field generated in the second chamber consists of a pattern of negative and positive pressures modulated with respect to a reference pressure,
   the first chamber is connected with the second chamber solely by the connection element,
   the stimulation device has no valves,
   the stimulation device is a portable hand-held device with a battery,
   the connection element is rigid and the first and second openings of the connection element are aligned to one another so that a media flow during a compression of the first chamber is directed to the clitoris through the straight channel with a nozzle effect, and
   the second opening of the connection element is configured to face the clitoris through the second chamber.

2. The stimulation device according to claim 1, wherein the second chamber is made of a flexible material and/or is fitted to a shape of a vaginal labia minora in such a way that the latter is completely covered by the opening of the second chamber.

3. The stimulation device according to claim 1, wherein the second chamber is designed in one-piece with the connection element and the first chamber.

4. The stimulation device according to claim 1, wherein the second chamber of the stimulation device is arranged to be replaceable.

5. The stimulation device according to claim 1, wherein the second chamber has a sealing bearing part to enlarge a contact surface of the second chamber on a skin.

6. The stimulation device according to claim 1, wherein the respective modulation of the pressure field is modifiable by means of an operating element.

7. The stimulation device according to claim 1, wherein the stimulation device has lighting for lighting the second chamber.

8. A system, comprising:
a stimulation device for a clitoris comprising:
   a pressure field generator comprising:
      a first chamber having a single opening;
      a second chamber having first and second openings, the second opening of the second chamber for placing over the clitoris; and
      a connection element having a first opening and a separate second opening thereby forming a straight channel connecting the single opening of the first chamber with the first opening of the second chamber;
   a drive unit that changes a volume of the first chamber in such a manner that a stimulating pressure field is generated in the second chamber via the connection element; and
   a control device that actuates the drive unit;
a housing enclosing the pressure field generator, the drive unit, and the control device; and
a remote control device arranged separately to the stimulation device,
wherein:
   the pressure field generated in the second chamber consists of a pattern of negative and positive pressures modulated with respect to a reference pressure,
   the first chamber is connected with the second chamber solely by the connection element,
   the stimulation device has no valves,
   the stimulation device is a portable hand-held device with a battery,
   the connection element is rigid and the first and second openings of the connection element are aligned to one another so that a media flow during a compression of the first chamber is directed to the clitoris through the straight channel with a nozzle effect, and
   the second opening of the connection element is facing the clitoris through the second chamber; and
   the control device of the stimulation device is remote controlled by the remote control device.

\* \* \* \* \*

(12) INTER PARTES REVIEW CERTIFICATE (3266th)
United States Patent
Lenke (10) Number: US 9,763,851 K1
(45) Certificate Issued: Oct. 6, 2023

(54) STIMULATION DEVICE (71) Applicant: Michael Lenke

(72) Inventor: Michael Lenke

(73) Assignee: NOVOLUTO GMBH

Trial Number:
IPR2019-01444 filed Jul. 31, 2019

Inter Partes Review Certificate for:
Patent No.: 9,763,851
Issued: Sep. 19, 2017
Appl. No.: 15/023,471
Filed: Mar. 21, 2016

The results of IPR2019-01444 are reflected in this inter partes review certificate under 35 U.S.C. 318(b).

INTER PARTES REVIEW CERTIFICATE
U.S. Patent 9,763,851 K1
Trial No. IPR2019-01444
Certificate Issued Oct. 6, 2023

AS A RESULT OF THE INTER PARTES REVIEW PROCEEDING, IT HAS BEEN DETERMINED THAT:

Claims 1-6 are found patentable.

\* \* \* \* \*